United States Patent
Frodsham et al.

(10) Patent No.: US 7,203,872 B2
(45) Date of Patent: Apr. 10, 2007

(54) CACHE BASED PHYSICAL LAYER SELF TEST

(75) Inventors: Tim Frodsham, Portland, OR (US); Lakshminarayan Krishnamurty, Hillsboro, OR (US); Naveen Cherukuri, San Jose, CA (US); Sanjay Dabral, Palo Alto, CA (US); David S. Dunning, Portland, OR (US); Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 10/882,966

(22) Filed: Jun. 30, 2004

(65) Prior Publication Data

US 2006/0005092 A1 Jan. 5, 2006

(51) Int. Cl.
*G01R 31/28* (2006.01)
*G06F 11/00* (2006.01)

(52) U.S. Cl. .................. 714/716; 714/715; 714/735; 714/43; 714/44

(58) Field of Classification Search ............. None
See application file for complete search history.

(56) References Cited

U.S. PATENT DOCUMENTS

| | | | |
|---|---|---|---|
| 6,617,842 B2 * | 9/2003 | Nishikawa et al. | 324/158.1 |
| 6,651,205 B2 * | 11/2003 | Takahashi | 714/738 |
| 6,826,100 B2 * | 11/2004 | Ellis et al. | 365/201 |
| 2004/0097093 A1 * | 5/2004 | Fukuyama et al. | 438/735 |

* cited by examiner

*Primary Examiner*—Christine T. Tu
(74) *Attorney, Agent, or Firm*—Blakely, Sokoloff, Taylor & Zafman LLP

(57) ABSTRACT

A software self test engine is executed from a cache of a processor. The software self test engine is executed using an execution engine of the processor to perform a physical layer self test. The physical layer self test is performed by transmitting a test vector from the execution engine under control of the self test engine to an input/output ("I/O") unit of the processor along a datapath coupling the execution engine to the I/O unit. The test vector is transmitted along a loop back path including the I/O unit and the datapath to test a hardware device along the loop back path.

31 Claims, 5 Drawing Sheets

CACHE BASED PHYSICAL LAYER SELF TEST

TECHNICAL FIELD

This disclosure relates generally to built in self testing, and in particular but not exclusively, relates to input/output built in self testing.

BACKGROUND INFORMATION

In many integrated circuit technologies, a short between a signal line and one of ground or a power supply can cause the signal line to be "stuck at" a fixed voltage level. Other manufacturing flaws can cause a switch to be "stuck open", "stuck closed", or generate an erroneous output for a given set of inputs. For analog circuitry, faults may present themselves as an erroneous impedance, driver output strength, and receiver offset. Other errors are possible. Built in self test ("BIST") is a circuit design technique in which physical elements of a circuit are devoted to testing the circuit itself to identify, for example, stuck at faults. Input/output BIST ("IBIST") is a design technique for testing input/output ("I/O") circuitry.

FIG. 1 is a block diagram illustrating a central processing unit ("CPU") 100 having a processor core for executing software instructions coupled via a datapath to an I/O unit for communicating with devices external to the CPU. CPU 100 includes IBIST logic 105 that may be internal to the I/O unit or integrated along side the I/O unit. IBIST logic 105 is physical test circuitry cast into the silicon of CPU 100 along side operation circuitry for the express purpose of testing the operation circuitry of the I/O unit. IBIST logic 105 may include logic to directly stimulate the I/O unit with test vectors strategically designed to test certain portions of the I/O unit to determine whether these portions contain a manufacturing flaw.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing a software self test engine are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
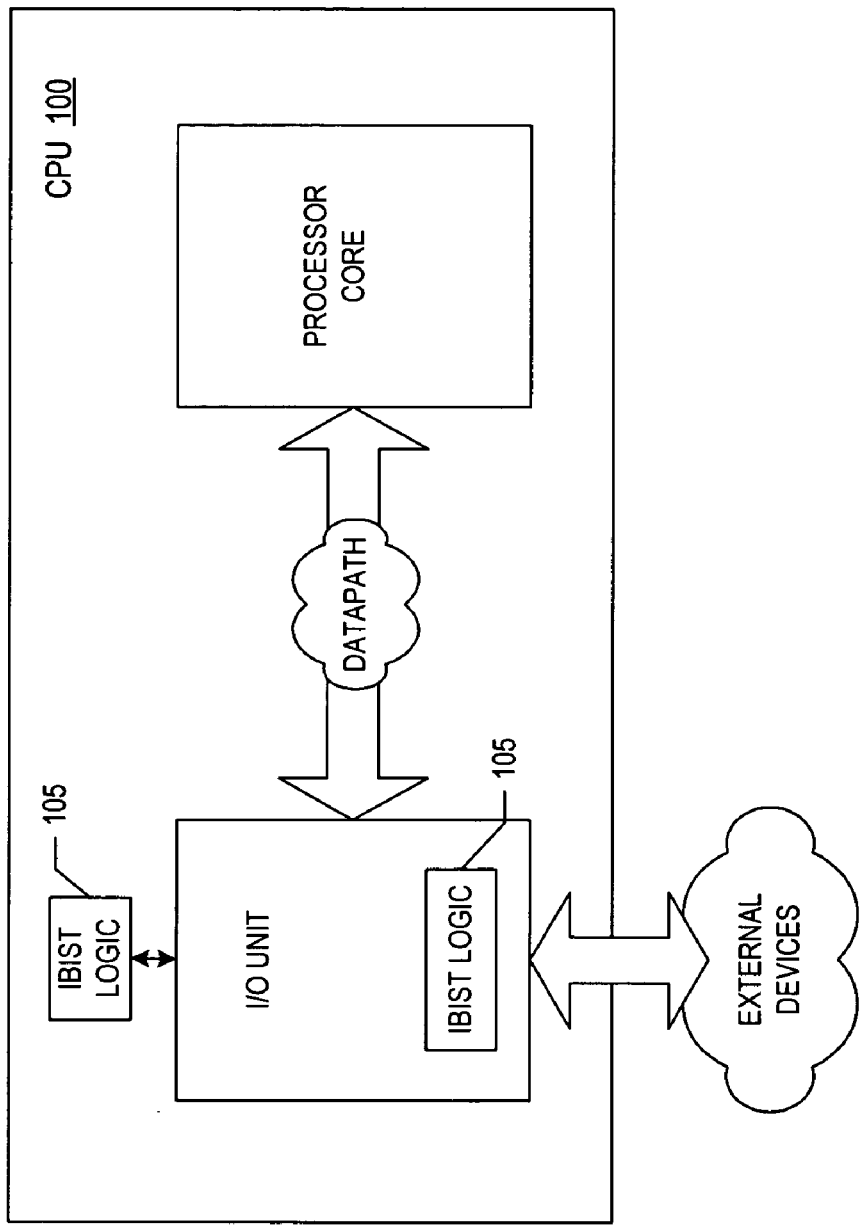
FIG. 1 is a block diagram illustrating a known central processing unit including input/output built in self test ("IBIST") logic cast in silicon.
Figure 2:
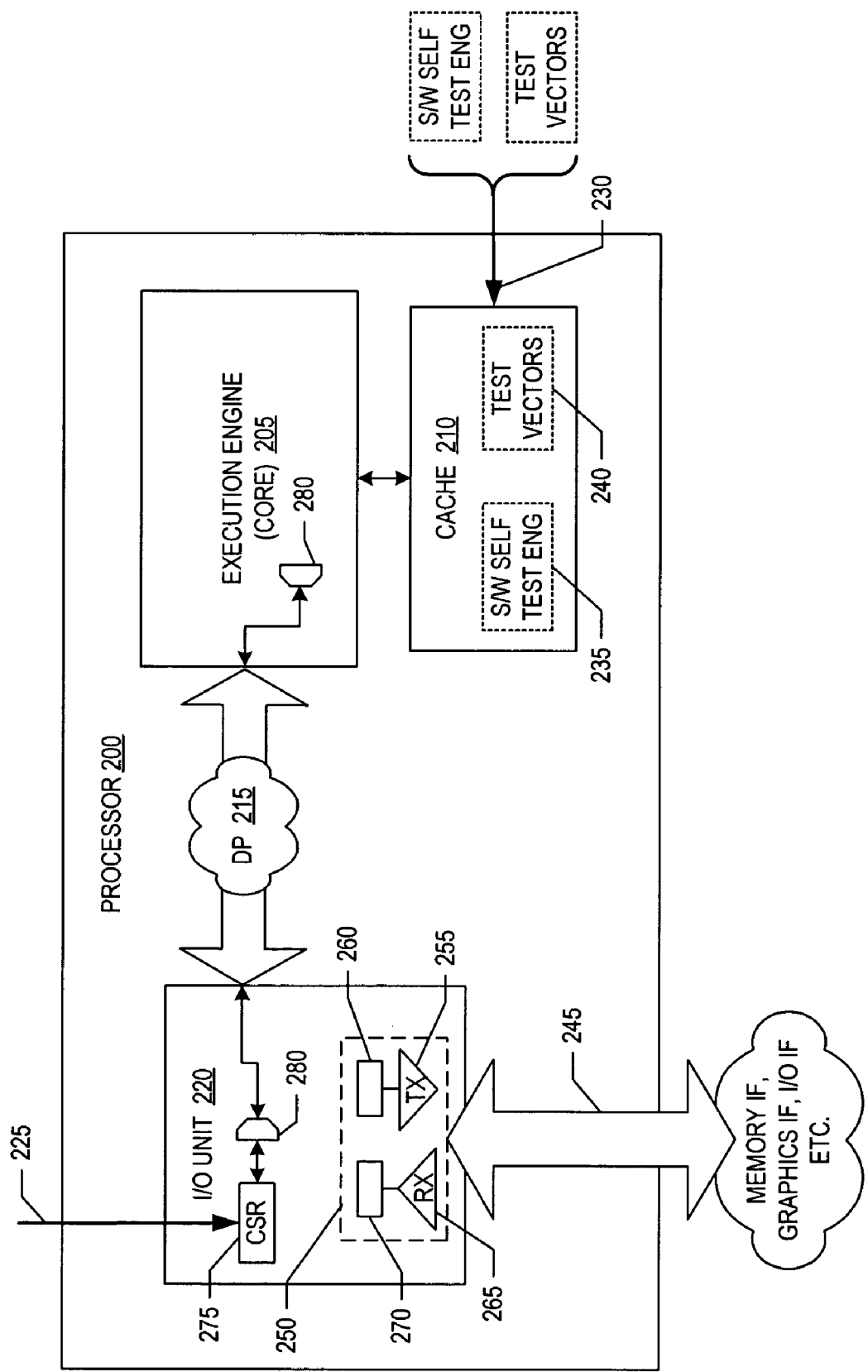
FIG. 2 is a block diagram illustrating a processor capable of receiving and executing a software self test engine, in accordance with an embodiment of the present invention.

FIG. 2 is a block diagram illustrating a processor 200 capable of receiving and executing a software self test engine, in accordance with an embodiment of the present invention. The illustrated embodiment of processor 200 includes an execution engine 205 (a.k.a. processor core), a cache 210, a datapath 215, an input/output ("I/O") unit 220, and test access ports ("TAPs") 225 and 230.

The components of processor 200 are interconnected as follows. Execution engine 205 is coupled to cache 210 to receive and execute instructions therefrom. Cache 210 may represent any cache coupled to execution engine 205, such as level 1 and level 2 cache, system random access memory ("RAM"), and the like. In one embodiment, a software self test engine 235 and test vectors (or test generation algorithms) 240 may be loaded into cache 210 via TAP 230. Once loaded into cache 210, execution engine 205 can execute software self test engine 235 from cache 210.

In one embodiment, software self test engine 235 is a virtual input/output built in self test ("IBIST") module that replicates the functionality of hardware IBIST circuitry. Software self test engine 235 leverages the presence of execution engine 205 to perform self test functionality that would otherwise require dedicated IBIST logic cast in silicon. Software self test engine 235 performs physical layer self tests to execute design verification and/or test for manufacturing defects in I/O circuitry. I/O circuitry may include any hardware/logic that is accessible to execution engine 205.

Execution engine 205 is further coupled to I/O unit 220 via datapath 215. In one embodiment, datapath 215 is a 20-bit wide bus coupling I/O unit 220 to execution engine 205. Datapath 215 may include simple signal lines to a complex network of drivers, receivers, buffers, latches, repeaters, alignment circuitry, and the like, to convey data back and forth between I/O unit 220 and execution engine 205. Executing software self test engine 235 from cache 210 enables test exercises to be run on datapath 215 itself. These tests may target datapath 215 to search for defects or characterize the performance of datapath 215. It should be noted that traditional hardware IBIST circuits (e.g., IBIST 105) would not have access to datapath 215 and therefore could not test datapath 215.

I/O unit 220 provides a link to external devices not integrated into the die of processor 200. For example, I/O unit 220 may couple to a system bus 245 (e.g., front side bus), which in turn couples to any number of external hardware devices. These external hardware devices may include typical devices disposed on a motherboard. For example, system bus 245 may couple to a memory interface (e.g., memory controller hub), an I/O interface (e.g., I/O controller hub), a graphics interface (e.g., advance graphics port), and the like.

I/O unit 220 includes a transceiver 250 for transmitting/receiving data to/from system bus 245. Transceiver 250 includes drivers 255 to transmit data onto system bus 245 and transmit buffers 260 to buffer the data received along datapath 215 prior to transmitting onto system bus 245. Transceiver 250 further includes receivers 265 coupled to receive data from system bus 245 and receive buffers 270 coupled to temporarily buffer the received data prior to forwarding the received data to execution engine 205 via datapath 215.

The illustrated embodiment of I/O unit 220 further includes control and status registers ("CSRs") 275. CSRs 275 enable I/O unit 220 to be programmed with command data and save status information. In one embodiment, CSRs 275 may be externally written to via TAP 225. In one embodiment, CSRs 275 are exposed and accessible to execution engine 205 over datapath 215. In the latter embodiment, execution engine 205 and/or I/O unit 220 may include decode logic 280 to enable execution engine 205 to address and map CSRs 275. During normal operation of processor die 200, CSRs 275 are hidden or otherwise locked out from execution engine 205 and applications executing on execution engine 205. However, during a self-test mode of operation, execution engine 205 is granted access to CSRs 275. In one embodiment, software self test engine 235 includes a key to access CSRs 275 during the self-test mode of operation. Thus, CSRs 275 may be accessible both externally to a technician or test equipment via TAP 225 and/or internally to execution engine 205 via datapath 215.

Figure 3:
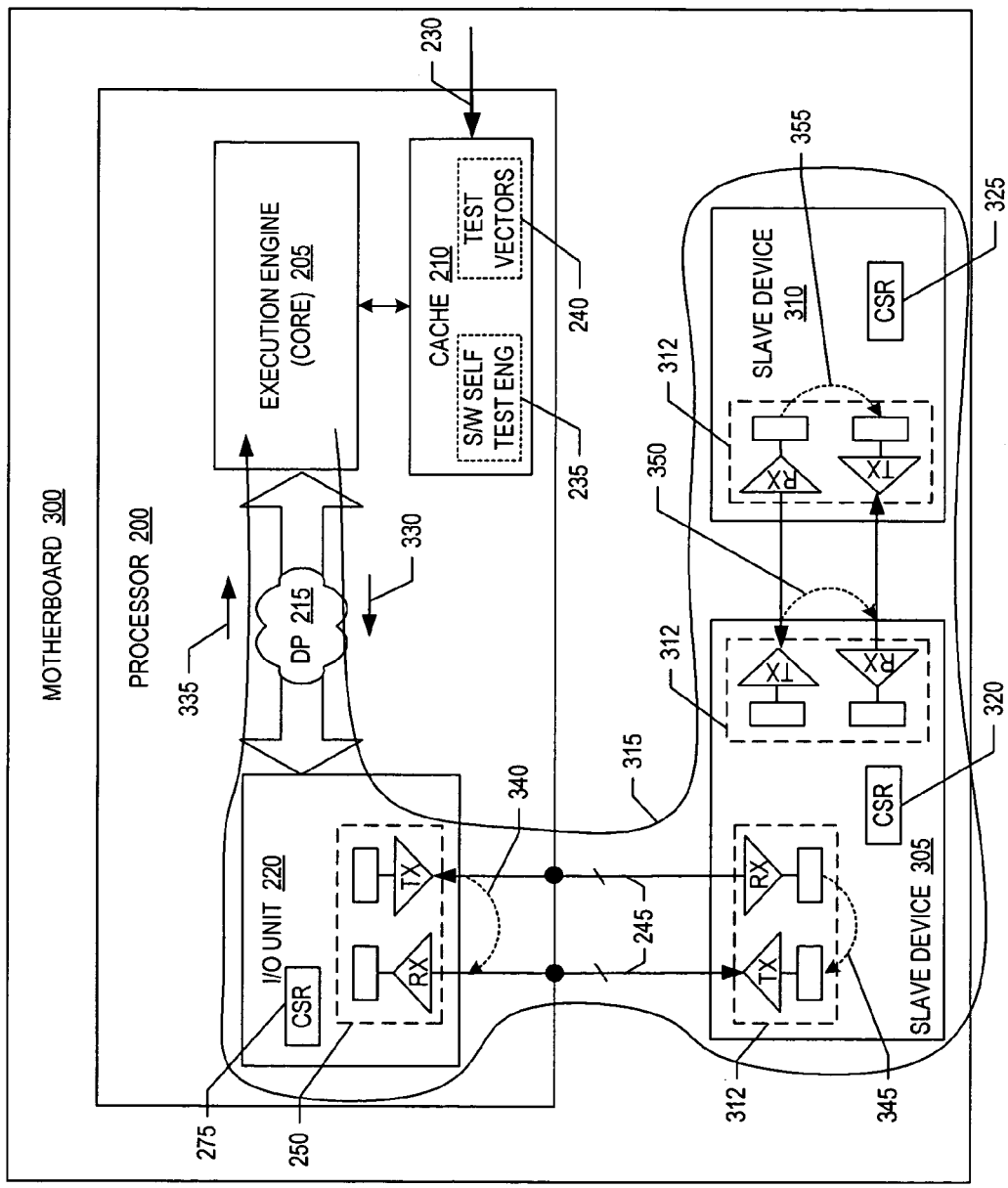
FIG. 3 is a block diagram illustrating a motherboard including a processor capable of executing a software self test engine to test hardware devices along a loop back path, in accordance with an embodiment of the present invention.

FIG. 3 is a block diagram illustrating a motherboard 300 including processor 200 capable to execute a software self test engine to test hardware devices along a loop back path, in accordance with an embodiment of the present invention. The illustrated embodiment of motherboard 300 includes processor 200, a slave device 305, and a slave device 310. In the illustrated embodiment, each slave device 305 and 310 includes one or more transceivers 312, similar to transceiver 250, to receive and transmit data thereon.

Slave devices 305 and 310 represent devices external to processor 200 (i.e., not integrated onto the die of processor 200) coupled to processor 200 via I/O unit 220. For example, slave device 305 may be a memory interface, a graphics interface, or a repeater, while slave device 310 may be the actual memory unit or graphics engine. Slave devices 305 and 310 may be "daisy chained" to system bus 245, as illustrated, or multiple slave devices may be directly coupled to system bus 245 (not illustrated).

Each of I/O unit 220, slave device 305, and slave device 310 can be placed in a loop back test mode to test hardware circuitry along a loop back path 315. I/O unit 220 can be placed into the loop back test mode by software self test engine 235 accessing CSR 275 via datapath 215 and writing command data to CSR 275. Similarly, software self test engine 235 can place each of slave devices 305 and 310 into the loop back test mode by accessing and writing command data to CSR 320 and 325, respectively.

The processes explained below are described in terms of computer software and hardware. The techniques described may constitute machine-executable instructions embodied within a machine (e.g., computer) readable medium, that when executed by a machine will cause the machine to perform the operations described. The order in which some or all of the process blocks appear in each process should not be deemed limiting. Rather, one of ordinary skill in the art having the benefit of the present disclosure will understand that some of the process blocks may be executed in a variety of orders not illustrated.

Figure 4:
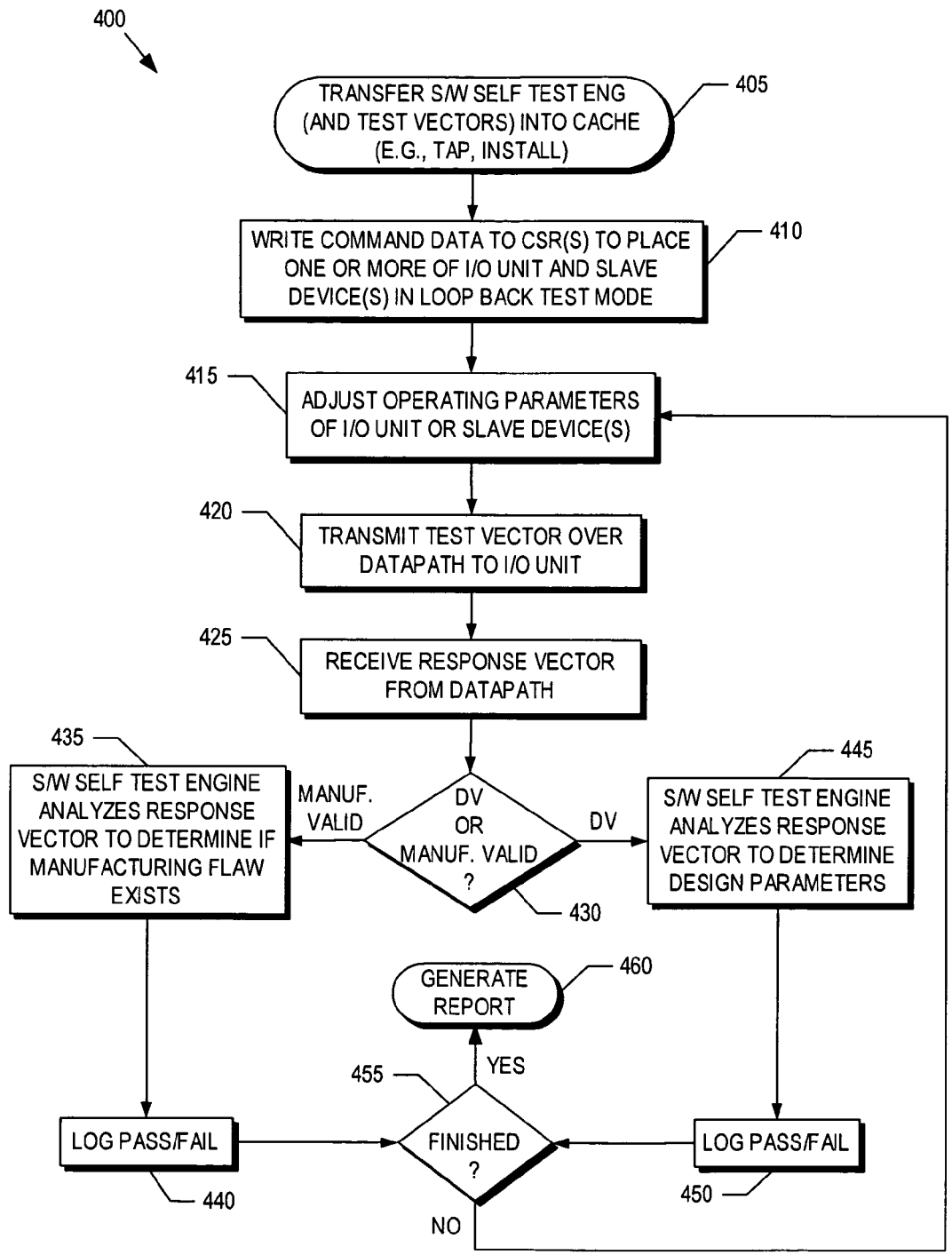
FIG. 4 is a flow chart illustrating a process for executing a software self test engine, in accordance with an embodiment of the present invention.

FIG. 4 is a flow chart illustrating a process 400 to implement physical layer self tests using a cache based software self test engine, in accordance with an embodiment of the present invention.

In a process block 405, software self test engine 235 is transferred into cache 210. In one embodiment, software self test engine 235 is transferred into cache 210 via TAP 230. In this embodiment, software self test engine 235 may be used to perform physical layer self test before any operating system ("OS") is loaded by processor 200. In one embodiment, software self test engine 235 is transferred into cache 210 via an ordinary software install during OS runtime. In this latter embodiment, software self test engine 235 may be executed to perform various design verification tests (e.g., stress tests that determine operational limits of hardware coupled to execution engine 205 along loopback path 315). It should be appreciated that design verification tests may be performed after testing for manufacturing flaws and I/O unit 220 and datapath 215 are known to be free of disabling manufacturing flaws.

In a process block 410, execution engine 205 under the control of software self test engine 235 writes command data to one or more of CSRs 275, 320, and 325 to place one or more of I/O unit 220, slave device 305, and slave device 310 into the loop back test mode. Placing one or more of I/O unit 220, slave device 305, and slave device 310 into the loop back test mode enables software self test engine 235 to transmit test vectors 330 onto datapath 215 that are routed back to software self test engine 235 as response vectors 335 along loop back path 315.

In one embodiment, software self test engine 235 can configure I/O unit 220 to perform near-end self tests that only test the functionality of datapath 215 and I/O unit 220. During these near-end tests, loop back path 315 is shortened to loop back along path 340. In one embodiment, software self test engine 235 can configure I/O unit 220 and slave device 305 to perform far-end self tests that test the functionality of datapath 215, I/O unit 220, and slave device 305. During these far end tests, loop back path 315 is selectively adjusted to loop back along one of paths 345 or 350. In one embodiment, software self test engine 235 can configure I/O unit 220, slave device 305, and slave device 310 to perform deep far-end tests that test the functionality of datapath 215, I/O unit 220, slave device 305, and slave device 310. During these deep far-end tests, loop back path 315 is lengthened to loop back along a path 355.

In a process block 415, software self test engine 235 transmits control data onto datapath 215 to adjust operating parameters of the device under test. For example, transceiver 250 may include 64 individual drivers 255 and transmit buffers 260, each corresponding to a bit line of system bus 245. In this case, software self test engine 235 may transmit control data to I/O unit 220 to enable one of the driver circuits for testing. In one embodiment, the control data is written to one or more of CSRs 275, 320, and 325 to setup and target various components (e.g., transceivers 250 and 312) in each of I/O unit 220 and slave devices 305 and 310 for physical layer self testing.

In a process block 420, software self test engine 235 transmits test vectors 330 over datapath 215 to I/O unit 220. Test vectors 330 are selected to rigourously test hardware along loop back path 315. For example, test vector 330 may include 256 alternating "0" and "1" bits to test whether a particular driver circuit of transceivers 250 or 312 is functioning properly. Test vectors 330 transmitted over datapath 215 may be obtained by software self test engine 235 from cache 210 where they are stored as test vectors 240. As discussed above, test vectors 240 can be uploaded into cache 210 via TAP 230 as a pre-configured set of test vectors, pseudo-randomly generated by software self test engine 235 itself using the processing resources of execution engine 205, generated according to preconfigured guidelines, or a combinations thereof.

Once transmitted, test vector 330 is looped back along loop back path 315 as response vector 335 (process block 425). In a decision block 430, if software self test engine 235 is testing for a manufacturing flaws, then process 400 continues to a process block 435. In process block 435, software self test engine 235 analyzes response vector 335 to determine whether a manufacturing flaw exits along loop back path 315. Manufacturing flaws may include stuck at faults, shorts, parasitic capacitances, and the like. Since test vectors 330 are transmitted over datapath 330, a manufacturing flaw within datapath 215 can be tested for and discovered using the techniques described herein. Furthermore, by beginning with near-end tests and gradually extending loop back path 315 out to include far-end and deep far-end testing, hardware flaws can be isolated to a particular component of motherboard 300 or processor 200.

In one embodiment, analyzing response vector 335 includes comparing response vector 335 against test vector 330 to determine whether the two vectors are identical. If response vector 335 is supposed to return to software self test engine 235 as an identical replica to the transmitted test vector 330, but instead returns with a bit flipped, then software self test engine 235 may determine a flaw exists. In one embodiment, response vector 335 is compared bit-by-bit against the transmitted test vector 335. In one embodiment, checksums are computed for each of test vector 330 and response vector 335 and the checksums are compared. In other embodiments, response vectors 335 are intended to change in a known manner after traversing loop back path 315. In a process block 440, software self test engine 235 logs a pass and/or fail for each test vector 330 and response vector 335 pair. The number of errors occurring in response vector 335 can be counted and a bit error rate ("BER") of the loop back path 315 calculated.

Returning to decision block 430, if software self test engine 235 is testing for design verification, then process 400 continues to a process block 445. In process block 445, software self test engine 235 analyzes response vector 335 to determine design parameters. Testing for design verification may include stress testing various components (e.g., datapath 215) to determine maximum clock speeds, signal margins, BERs, testing for clock harmonic responses, and the like. For example, software self test engine 235 may adjust sampling timing of I/O unit 220 on datapath 215 and/or system bus 245 to determine signal margins. In a process block 440, software self test engine 235 logs a pass and/or fail for each test vector 330 and response vector 335 pair.

In a decision block 455, software self test engine 235 determines whether all test vectors 240 have been transmitted. If not, process 400 returns to process block 415 and continues therefrom as described above. It should be noted that multiple test vectors may be transmitted without adjusting operating parameters of I/O unit 220, slave device 305, or slave device 310 and therefore, process block 415 may be periodically skipped. If all the test vectors have been transmitted and the self testing complete, then process 400 continues to a process block 460 to generate a pass/fail report. In one embodiment, the pass/fail report is stored in cache 210 and downloaded from cache 210 via TAP 230.

Implementing IBIST functionality using software self test engine 235 loaded into cache 210 provides added flexibility. Often optimal test vectors for verifying problematic portions of a processor are not known until the processor is taped out and entered high volume manufacturing for sale. Since current IBIST engines are finite state machines cast in silicon, adding a new optimized set of test vectors can be very costly requiring a new tape out of the processor die. However, embodiments of the present invention enable circuit designers, original equipment manufactures, and the like to augment existing test vectors with new ones as they become available, simply by uploading the new test vectors via TAP 230 into cache 210. Additionally, software self test engine 235 helps ameliorate the tremendous burden of extensive pre-silicon validation and post silicon debug of extensive design for test features imbedded in silicon, as well as, the expense and lengthy turn around time to fix bugs or add enhancements to the design for test circuitry.

Figure 5:
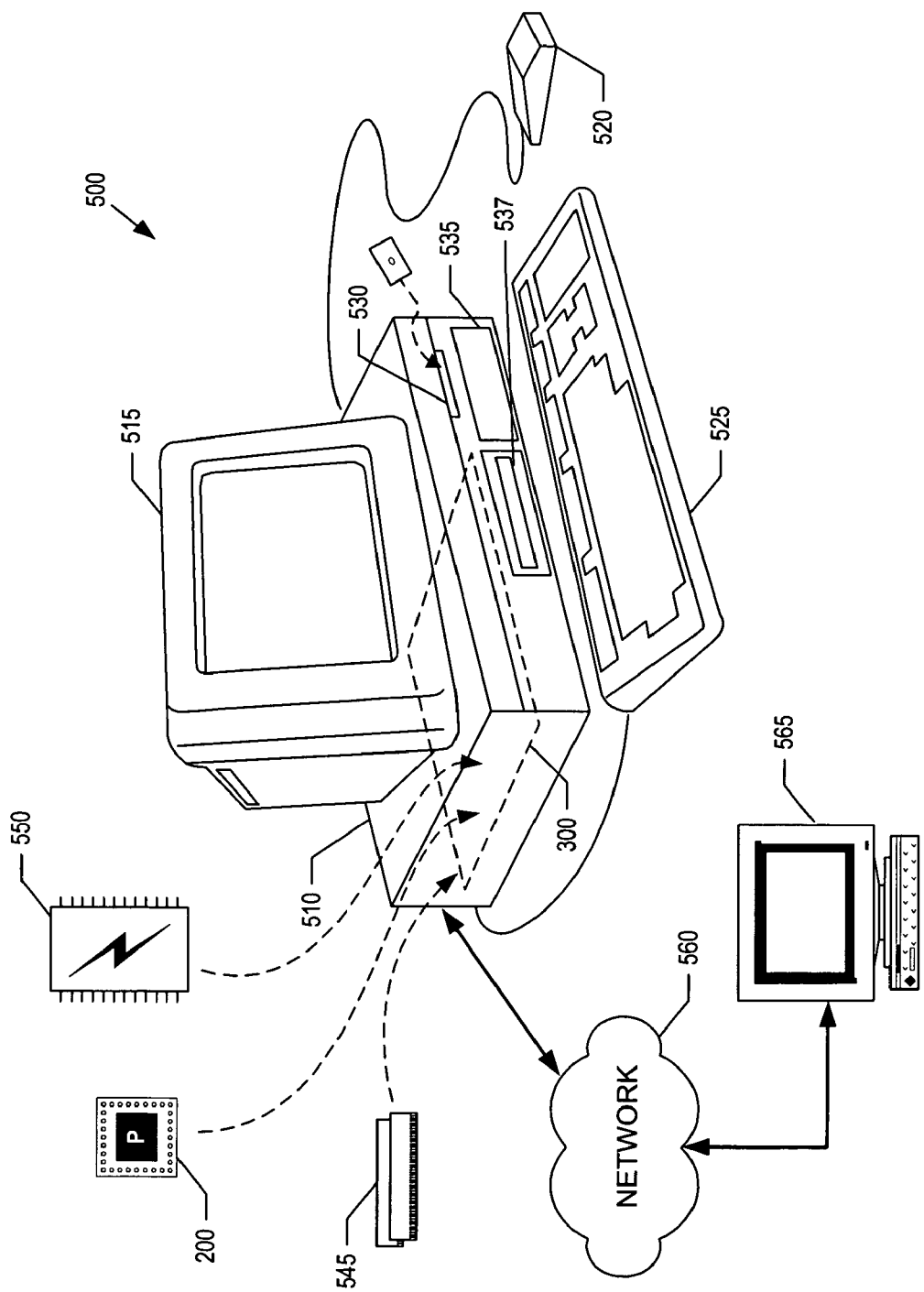
FIG. 5 is a diagram illustrating a demonstrative processing system for implementing embodiments of the present invention.

FIG. 5 is a diagram illustrating a demonstrative processing system 500 for implementing embodiments of the present invention. The illustrated embodiment of system 500 includes a chassis 510, a monitor 515, a mouse 520 (or other pointing device), and a keyboard 525. The illustrated embodiment of chassis 510 further includes a floppy disk drive 530, a hard disk 535, a compact disc ("CD") and/or digital video disc ("DVD") drive 537, a power supply (not shown), and motherboard 300 populated with appropriate integrated circuits including system memory 545, nonvolatile ("NV") memory 550, and one or more processor(s) 200.

Processor(s) 200 is communicatively coupled to system memory 545, NV memory 550, hard disk 535, floppy disk drive 530, and CD/DVD drive 537 via a chipset on motherboard 300 to send and to receive instructions or data thereto/therefrom. In one embodiment, NV memory 550 is a flash memory device. In other embodiments, NV memory 550 includes any one of read only memory ("ROM"), programmable ROM, erasable programmable ROM, electrically erasable programmable ROM, or the like. In one embodiment, system memory 545 includes random access memory ("RAM"), such as dynamic RAM ("DRAM"), synchronous DRAM, ("SDRAM"), double data rate SDRAM ("DDR SDRAM"), static RAM ("SRAM"), and the like. In various embodiments, either of NV memory 550 or system memory 545 may represent slave device 310, while a memory controller/interface (not illustrated) may represent slave device 305.

Hard disk 535 represents any storage device for software data, applications, and/or operating systems, but will most typically be a nonvolatile storage device. Hard disk 535 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

In one embodiment, a network interface card ("NIC") (not shown) is coupled to an expansion slot (not shown) of motherboard 300. The NIC is for connecting system 500 to a network 560, such as a local area network, wide area network, or the Internet. In one embodiment network 560 is further coupled to a remote computer 565, such that system 500 and remote computer 565 can communicate.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   executing a software self test engine buffered within an on-die cache of a processor with an execution engine of the processor to execute a physical layer self test; and
   transmitting a test vector from the execution engine under control of the self test engine to an input/output ("I/O") unit of the processor along a datapath coupling the execution engine to the I/O unit, the test vector transmitted along a loop back path including the I/O unit and the datapath to test a hardware device along the loop back path.

2. The method of claim 1, further comprising:
   receiving a response vector at the executing engine from the loop back path in response to transmitting the test vector; and
   analyzing the response vector to test the hardware device along the loop back path.

3. The method of claim 2, wherein analyzing the response vector comprises comparing the response vector against the test vector to determine whether the response vector is identical to the test vector.

4. The method of claim 2, wherein analyzing the response vector to test the hardware device comprises testing the hardware device for at least one of a manufacturing flaw and design validation.

5. The method of claim 2, further comprising:
   transferring the software self test engine into the on-die cache of the processor via a test access port ("TAP").

6. The method of claim 2, further comprising:
   loading the software self test engine into the on-die cache of the processor under control of an operating system executing on the processor.

7. The method of claim 2, further comprising:
   accessing a command and status register ("CSR") of the I/O unit via the datapath; and
   writing to the CSR of the I/O unit to place the I/O unit into a loop back test mode.

8. The method of claim 2, further comprising routing the test vector through at least one slave device coupled to the I/O unit, and wherein the hardware device comprises the slave device.

9. The method of claim 8, further comprising setting a CSR of the slave device to place the slave device into the loop back test mode.

10. The method of claim 2, further comprising adjusting operating parameters of the I/O unit under control of the software self test engine.

11. The method of claim 10, wherein adjusting the operating parameters of the I/O unit includes adjusting sampling timing of the I/O unit on the datapath to determine signal margins.

12. The method of claim 1, wherein the software self test engine comprises a virtual I/O built-In Self-Test ("IBIST") engine.

13. The method of claim 1, further comprising generating the test vectors under control of the software self test engine according to an test vector generation algorithm.

14. A machine-accessible medium that provides instructions that, if executed by a machine, will cause the machine to perform operations comprising:
    transmitting a test vector from an execution engine of a processor to an input/output ("I/O") unit of the processor along a datapath coupling the execution engine to the I/O unit, the test vector transmitted along a loop back path including the I/O unit and the datapath;
    receiving a response vector from the datapath at the execution engine in response to transmitting the test vector; and
    analyzing the response vector to execute a physical layer self test on a hardware device along the loop back path.

15. The machine-accessible medium of claim 14, providing further instructions that, if executed by the machine, will cause the machine to perform further operations, comprising:
    accessing at least one command and status register ("CSR") of the I/O unit; and
    writing to the at least one command and status register ("CSR") of the I/O unit to place the I/O unit into a loop back test mode.

16. The machine-accessible medium of claim 14, providing further instructions that, if executed by the machine, will cause the machine to perform further operations, comprising:
    routing the test vector through a first slave device coupled to the I/O unit to perform the physical layer self test on the first slave device, the loop back path including the first slave device.

17. The machine-accessible medium of claim 16, providing further instructions that, if executed by the machine, will cause the machine to perform further operations, comprising:
    accessing at least one command and status register ("CSR") of the slave device via the datapath; and
    writing to the at least one command and status register ("CSR") of the slave device to place the slave device into a loop back test mode.

18. The machine-accessible medium of claim 17, wherein the slave device comprises a memory controller.

19. The machine-accessible medium of claim 16, providing further instructions that, if executed by the machine, will cause the machine to perform further operations, comprising:
    routing the test vector through the first slave device and a second slave device coupled to the first slave device to perform the physical layer self test on the second slave device, the loop back path including the first and second slave devices.

20. The machine-accessible medium of claim 14, wherein the physical layer self test comprises a virtual input/output built in self test ("IBIST") executed from a software self test engine buffered within the cache.

21. A processor, comprising:
    a cache to receive a software self test engine;
    an execution engine coupled to the cache to execute the software self test engine from the cache;
    a datapath coupled to the execution engine; and
    an input/output ("I/O") unit coupled to the datapath, the I/O unit to couple the processor to external circuitry, the execution engine to transmit test vectors across the datapath to the I/O unit and to analyze response vectors received from the datapath under control of the software self test engine to test at least one of the datapath and the I/O unit.

22. The processor of claim 21, wherein the I/O unit further comprises:
command and status registers ("CSRs") to selectively configure the I/O unit into a loop back test mode and to hold status information about the I/O unit; and
decode logic coupled to the CSRs and coupled to the datapath, the decode logic to provide the execution engine access to the CSRs through the datapath when executing the software self test engine.

23. The processor of claim 22, further comprising a test access port ("TAP") coupled to load the software self test engine into the cache.

24. The processor of claim 22, wherein the CSRs are to selectively configure the I/O unit into the loop back test mode to route the test vectors back over the datapath as the response vectors.

25. A system, comprising:
a motherboard;
a memory interface disposed on the motherboard and communicatively coupled to synchronous dynamic random access memory ("SDRAM"); and
a processor disposed on the motherboard and communicatively coupled to the memory interface to access the SDRAM, the processor including:
a cache to receive a software self test engine to run physical layer self tests;
an execution engine to execute the software self test engine;
a datapath coupled to the execution engine; and
an input/output ("I/O") unit communicatively coupled to the datapath and to the memory interface, the execution engine to transmit first test vectors across the datapath and I/O unit along a loop back path under control of the software self test engine.

26. The system of claim 25, wherein the execution engine compares the first test vectors with second test vectors received on the datapath under the control of the software self test engine to determine whether a hardware flaw exists along the loop back path.

27. The system of claim 26, wherein each of the I/O unit and the memory interface include control and status registers ("CSRs") to configure the each of the I/O unit and the memory interface into a loop back test mode, the CSRs accessible by the execution engine via the datapath.

28. The system of claim 27, wherein the loop back path selectively includes the datapath, the I/O unit, and the memory interface in response to the software self test engine to test hardware along the loop back path.

29. The system of claim 25, further comprising a test access point ("TAP") coupled to the processor to transfer the software self test engine into the cache.

30. The system of claim 25, further comprising a graphics interface coupled to the I/O unit and wherein the loop back path selectively includes the datapath, the I/O unit, and the graphics interface to test hardware along the loop back path.

31. The system of claim 25, further comprising an I/O interface coupled to the I/O unit and wherein the loop back path selectively includes the datapath, the I/O unit, and the I/O interface to test hardware along the loop back path.

* * * * *